US012269050B2

(12) United States Patent
Xue et al.

(10) Patent No.: US 12,269,050 B2
(45) Date of Patent: Apr. 8, 2025

(54) WATER SPRAYING PIPE AND CLEANING APPARATUS

(71) Applicants: FOSHAN SHUNDE MIDEA WASHING APPLIANCES MANUFACTURING CO., LTD., Foshan (CN); MIDEA GROUP CO., LTD., Foshan (CN)

(72) Inventors: Weijun Xue, Foshan (CN); Tongsheng Wang, Foshan (CN); Wei Zhang, Foshan (CN); Hui Zhang, Foshan (CN)

(73) Assignees: FOSHAN SHUNDE MIDEA WASHING APPLIANCES MANUFACTURING CO., LTD, Foshan (CN); MIDEA GROUP CO., LTD., Foshan (CN)

( * ) Notice: Subject to any disclaimer, the term of this patent is extended or adjusted under 35 U.S.C. 154(b) by 869 days.

(21) Appl. No.: 17/285,465

(22) PCT Filed: Jun. 25, 2019

(86) PCT No.: PCT/CN2019/092729
§ 371 (c)(1),
(2) Date: Apr. 14, 2021

(87) PCT Pub. No.: WO2020/078032
PCT Pub. Date: Apr. 23, 2020

(65) Prior Publication Data

US 2021/0379609 A1 Dec. 9, 2021

(30) Foreign Application Priority Data

Oct. 16, 2018 (CN) ......................... 201811208316.4
Oct. 16, 2018 (CN) ......................... 201821682041.3

(51) Int. Cl.
*B05B 1/20* (2006.01)
*A47L 15/22* (2006.01)
(Continued)

(52) U.S. Cl.
CPC ................ *B05B 1/20* (2013.01); *A47L 15/22* (2013.01); *A47L 15/428* (2013.01); *B05B 1/044* (2013.01)

(58) Field of Classification Search
CPC .......... A47L 15/14; A47L 15/42; A47L 15/22; A47L 15/428; B05B 1/044; B05B 1/20;
(Continued)

(56) References Cited

U.S. PATENT DOCUMENTS 1,966,573 A * 7/1934 Webb ...................... A47L 15/16 239/553.5
3,960,328 A 6/1976 Archambault
(Continued)

FOREIGN PATENT DOCUMENTS

CN 201389002 Y 1/2010
CN 104958056 A 10/2015
(Continued)

OTHER PUBLICATIONS

Search Report for EP application 19873537.5.
(Continued)

*Primary Examiner* — Christopher R Dandridge
(74) *Attorney, Agent, or Firm* — Scully, Scott, Murphy & Presser, P.C.

(57) ABSTRACT

The present application discloses a water spraying pipe and a cleaning apparatus. The water spaying pipe includes a pipe body having a water inlet end and defining a water spraying hole in a pipe wall thereof; and a water spraying groove defined in the water spraying pipe at a position corresponding to the water spraying hole. The water spraying hole is in
(Continued)

communication with the water spraying groove, and a diameter of the water spraying hole is greater than a width of the water spraying groove. The present application effectively improves the cleaning efficiency of the water spraying pipe.

16 Claims, 7 Drawing Sheets

(51) Int. Cl.
*A47L 15/42* (2006.01)
*B05B 1/04* (2006.01)

(58) Field of Classification Search
CPC ......... B05B 1/042; B05B 1/14; B05B 15/658; B05B 3/06; B05B 3/0495; B05B 1/046; B05B 1/34
See application file for complete search history.

(56) References Cited

U.S. PATENT DOCUMENTS

| | | | | |
|---|---|---|---|---|
| 5,927,616 | A | 7/1999 | Grise et al. | |
| 2004/0250837 | A1* | 12/2004 | Watson | A47L 15/4278 134/32 |
| 2018/0221984 | A1* | 8/2018 | Toguyeni | B23K 20/122 |

FOREIGN PATENT DOCUMENTS

| | | | | |
|---|---|---|---|---|
| CN | 206303869 | U | 7/2017 | |
| CN | 107485357 | A | 12/2017 | |
| CN | 206700134 | U | 12/2017 | |
| CN | 206938718 | U | 1/2018 | |
| CN | 109124522 | A | 1/2019 | |
| CN | 109316151 | A | 2/2019 | |
| CN | 209122116 | U | 7/2019 | |
| DE | 102008004999 | A1 * | 7/2009 | B05B 1/044 |
| EP | 3868278 | A1 | 8/2021 | |
| JP | H09253020 | A | 9/1997 | |
| WO | 8301186 | A1 | 4/1983 | |
| WO | 2009125525 | A1 | 10/2009 | |

OTHER PUBLICATIONS

First OA received in CN application 201811208316.4; mailed Oct. 30, 2023.

Office Action dated Feb. 2, 2025 received in European Patent Application No. 19873537.5.

* cited by examiner

WATER SPRAYING PIPE AND CLEANING APPARATUS

CROSS-REFERENCES TO RELATED APPLICATIONS

The present disclosure is a national phase application of International Application No. PCT/CN2019/092729, filed on Jun. 25, 2019, which claims priority to Chinese Patent Applications Serial No. 201811208316.4 and No. 201821682041.3, filed with the National Intellectual Property Administration of P. R. China on Oct. 16, 2018, the entire contents of which are incorporated herein by reference.

FIELD

The present application relates to a field of dishwashers, and more particularly to a water spraying pipe, and a cleaning apparatus.

BACKGROUND

With improvement of people's living standards, dishwashers have been widely used. However, a conventional spray arm of the dishwashers sprays out thin water columns from spray nozzles, and no waterflow covers areas between the nozzles, so that in the use process of the spray arm, a lot of clean blind areas exist, and the spray arm has a low cleaning efficiency, resulting in a poor cleaning effect of the dishwasher.

SUMMARY

Embodiments of the present application are to provide a water spraying pipe, and is intended to improve cleaning efficiency of the water spraying pipe.

In one embodiment, the water spraying pipe proposed by the present application includes: a pipe body having a water inlet end, and a water spraying hole provided in a pipe wall thereof; a water spraying groove defined in the water spraying pipe at a position corresponding to the water spraying hole, the water spraying hole being in communication with the water spraying groove, a diameter of the water spraying hole being greater than a width of the water spraying groove.

In one embodiment, a ratio of the width l of the water spraying groove to the diameter Φ of the water spraying hole is 0.18~0.25.

In one embodiment, a ratio of a length L of the water spraying groove to the diameter Φ of the water spraying hole is greater than or equal to 2.5~3.5.

In one embodiment, a shape of a cross section of the water spraying groove is formed in one of a V shape, a trapezoidal shape, and a rectangular shape, and a long base of the trapezoidal shape is close to a groove opening.

In one embodiment, water spraying holes and water spraying grooves are provided and correspond to each other, and shapes of cross sections of the plurality of the water spraying grooves are formed in one or more of a V shape, a trapezoidal shape, and a rectangular shape.

In one embodiment, the cross section of the water spraying groove at a middle portion of the water spraying pipe is formed in a rectangular shape or a trapezoidal shape, and the cross sections of the water spraying grooves at two ends of the water spraying pipe are formed in a trapezoidal shape or a V shape; or the cross section of the water spraying groove close to the water inlet end of the water spraying pipe is formed in a V shape, the cross section of the water spraying groove at the middle portion of the water spraying pipe is formed in a trapezoidal shape, and the cross section of the water spraying groove away from the water inlet end of the water spraying pipe is formed in a rectangular shape.

In one embodiment, the water spraying hole includes a water inlet section and a transition section extending from the water inlet section to the water spraying groove, and the transition section cuts a bottom of the water spraying groove to extend to a groove opening of the water spraying groove.

In one embodiment, a diameter d of a top of the transition section is less than a diameter D of the water inlet section.

In one embodiment, an inner wall of the transition section forms an arc-shaped transition from the water inlet section to a wall of the water spraying groove.

In one embodiment, the width of the water spraying groove at a junction with the top of the transition section is k, and the diameter d of the top of the transition section is greater than or equal to twice k.

In one embodiment, an angle between a wall face of the water spraying groove and a plane where the groove opening lies is β, and β is 15~25°.

In one embodiment, the water spraying groove is defined in an outer wall of the pipe body.

In one embodiment, the water spraying pipe further includes a protrusion provided to an outer wall of the pipe body and corresponding to the water spraying hole, and the water spraying groove is defined in the protrusion.

In one embodiment, water spraying grooves are provided, and the plurality of water spraying grooves are arranged in an S-shape along a length direction of the pipe body.

In one embodiment, a height of water sprayed from a first water spraying groove is $h_1$, and a central angle corresponding to its fan-shaped spray-washing area is $\alpha_1$; a height of water sprayed from a second water spraying groove adjacent to the first water spraying groove is $h_2$, and a central angle corresponding to its fan-shaped spray-washing area is $\alpha_2$; a distance between a first water spraying hole and a second water spraying hole adjacent to each other is greater than 0, and less than or equal to: $h_1 \tan(\alpha_1/2)+h_2 \tan(\alpha_2/2)$.

In one embodiment, a distance between a first water spraying hole and a second water spraying hole is 20 mm~30 mm; and/or eight to ten water spraying holes are provided in each water spraying pipe.

In one embodiment, if a total amount of circulating water is M, a flow velocity of water in the water spraying hole is V, a total number of the water spraying holes is N, and an area of a cross section of the water spraying hole is S, then: $M*V \geq N*S/2$.

The present application further proposes a cleaning apparatus, including a tub or a washing tank, and the tub or the washing tank having a washing chamber; and a water spraying pipe including: a pipe body having a water inlet end, and a water spraying hole provided in a pipe wall thereof; a water spraying groove defined in the water spraying pipe at a position corresponding to the water spraying hole, the water spraying hole being in communication with the water spraying groove, a diameter of the water spraying hole being greater than a width of the water spraying groove.

In the embodiment of the present application, by provision of the water spraying hole and the water spraying groove, waterflow enters the pipe body under the action of water pressure and flows in the pipe body, enters the water spraying hole under the action of the water pressure when passing by the water spraying hole, and enters the water spraying groove via the water spraying hole; in this process, the waterflow passes through the water spraying hole of larger size, and then through the water spraying groove of a smaller width dimension, and is extended and sprayed out in a length direction of the water spraying groove, thus, the waterflow forms a fan-shape water wall after being sprayed from the water spraying groove, and forms a planar cleaning with rotation of the spraying pipe, and greatly improving cleaning effect of the water spraying pipe, compared with a linear cleaning area in the related art.

BRIEF DESCRIPTION OF THE DRAWINGS

To describe embodiments of the present application more clearly, the following will briefly introduce the accompanying drawings required for the description of the embodiments or the related art.

REFERENCE NUMERALS EXPLANATIONS

Figure 1:
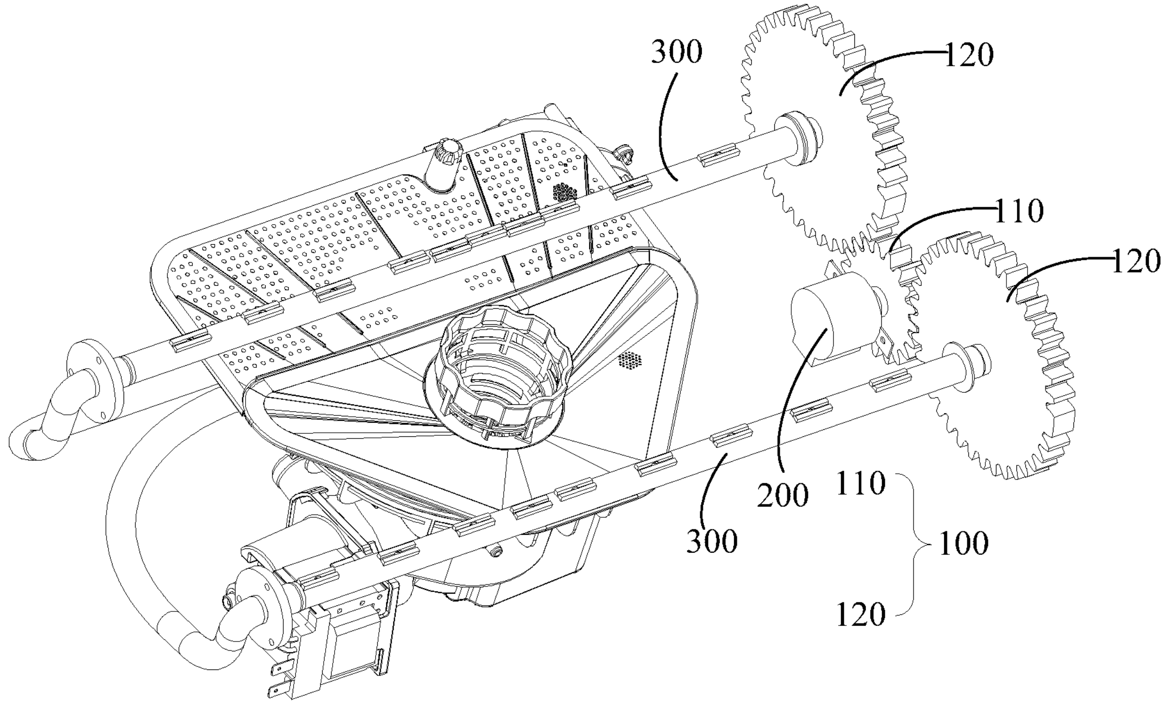
FIG. 1 is a schematic view of an embodiment of a spraying-wash device according to the present application.

| reference numeral | name | reference numeral | name |
|---|---|---|---|
| 100 | transmission mechanism | 110 | driving gear |
| 120 | driven gear | 200 | driving mechanism |
| 300 | water spraying pipe | 310 | pipe body |
| 311 | water inlet end | 312 | driving end |
| 320 | water spraying groove | 330 | water spraying hole |
| 331 | water inlet section | 332 | transition section |
| 340 | protrusion | | |

Realization of purposes, functional features of the present application will be further explained in combination the embodiments and with reference to the drawings.

DETAILED DESCRIPTION OF THE INVENTION

In embodiments of the present application will be clearly and completely described below with reference to the accompanying drawings in the embodiments of the present application. It is apparent that the described embodiments are only a part of the embodiments of the present application, and not all of them.

It should note that, all the directional indications in the embodiments of the present application, such as upper, lower, left, right, front, rear, etc., are only used to explain relative position relationship, movement situations, etc., between various components in a particular posture (as illustrated in the drawings), and if the particular posture is changed, then the directional indications will change accordingly.

In addition, terms such as “first” and “second” are used herein for purposes of description and are not intended to indicate or imply relative importance or significance. Thus, the feature defined with “first” and “second” may comprise one or more of this feature. Meanwhile, the term “and/or” present in the full text means to include three solutions. Taking “A and/or B” as an example, it includes a solution A, a solution B, or a solution satisfying A and B at the same time.

The present application mainly proposes a spraying-wash device, which is mainly applied in a dishwasher, to improve utilization of water in the dishwasher and cleaning efficiency of tableware. The spraying-wash device includes a water spraying pipe 300. By providing a water spraying hole 330 and a water spraying groove 320 in the water spraying pipe 300 at the same time, and communicating the water spraying hole 330 with the water spraying groove 320, water sprayed from the water spraying pipe 300 is fan-shaped, and forms a cleaning plane at a top of the water spraying pipe 300 when the water spraying pipe 300 rotates about a rotating axis along its length direction, and improving cleaning efficiency; by providing various rotation ways of the water spraying pipe 300, working states of the water spraying pipe 300 correspond to different cleaning modes to cope with different working conditions, and greatly improving the cleaning efficiency of the cleaning device, and greatly enhancing adaptability of the cleaning apparatus.

Structures of the spraying-wash device will be mainly described below.

Figure 2:
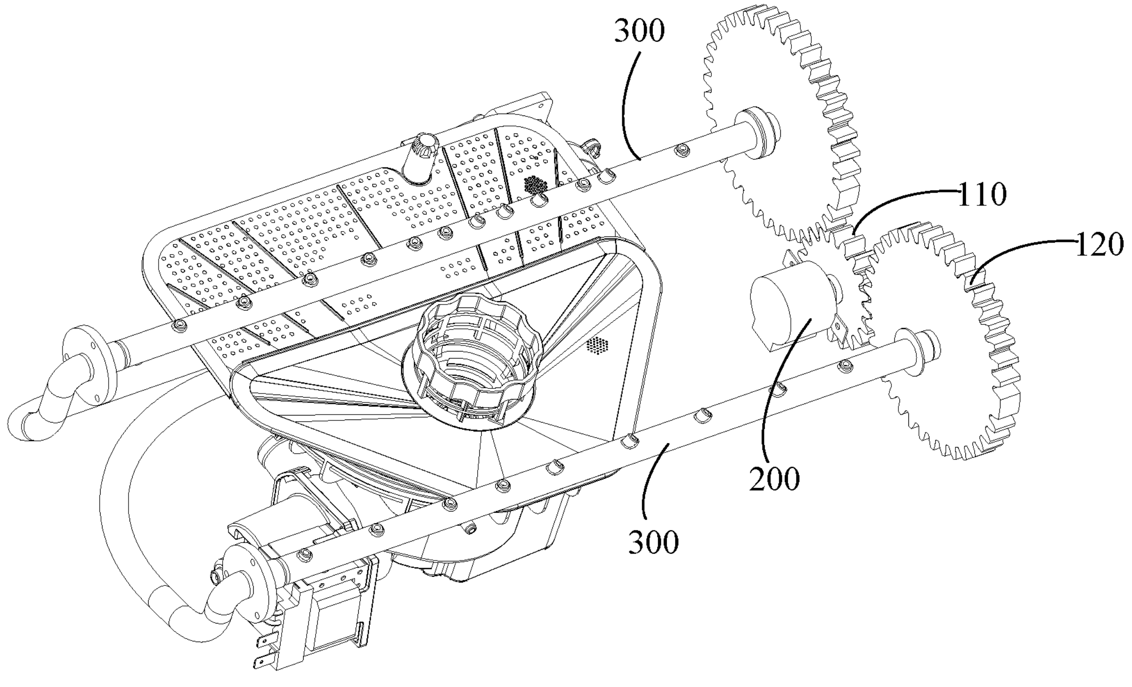
FIG. 2 is a schematic view of another embodiment of a spraying-wash device according to the present application.
Figure 3:
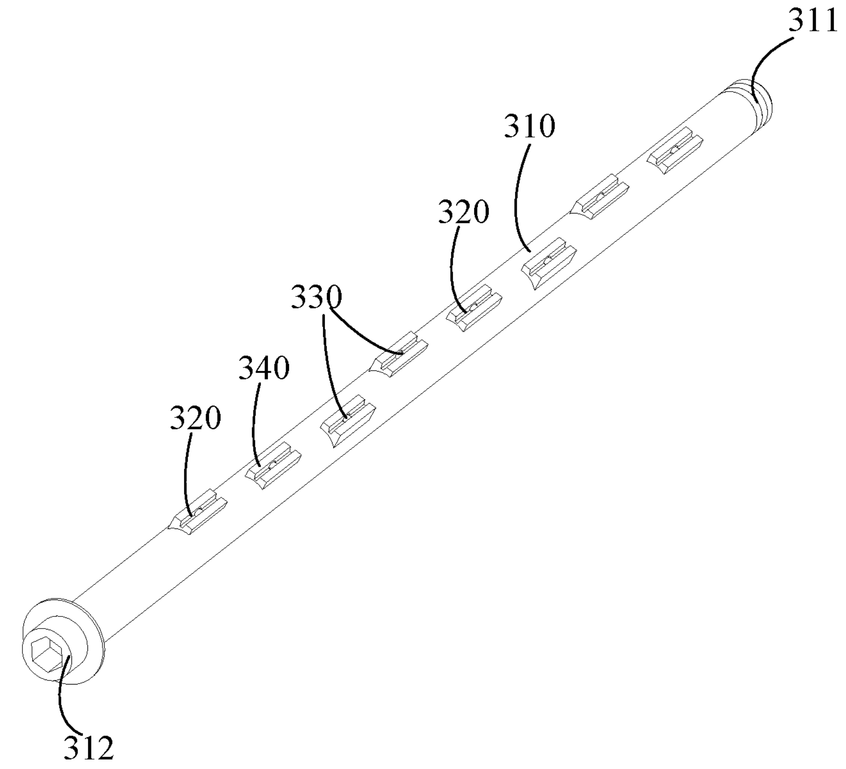
FIG. 3 is a schematic view of an embodiment of a spraying-wash pipe of a spraying-wash device according to the present application.
Figure 4:
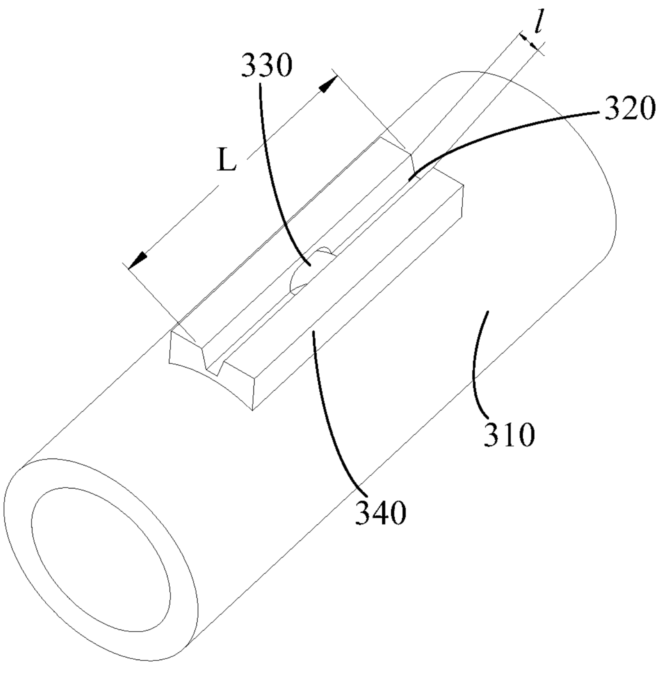
FIG. 4 is a schematic view of a part of a pipe body in FIG. 3.
Figure 5:
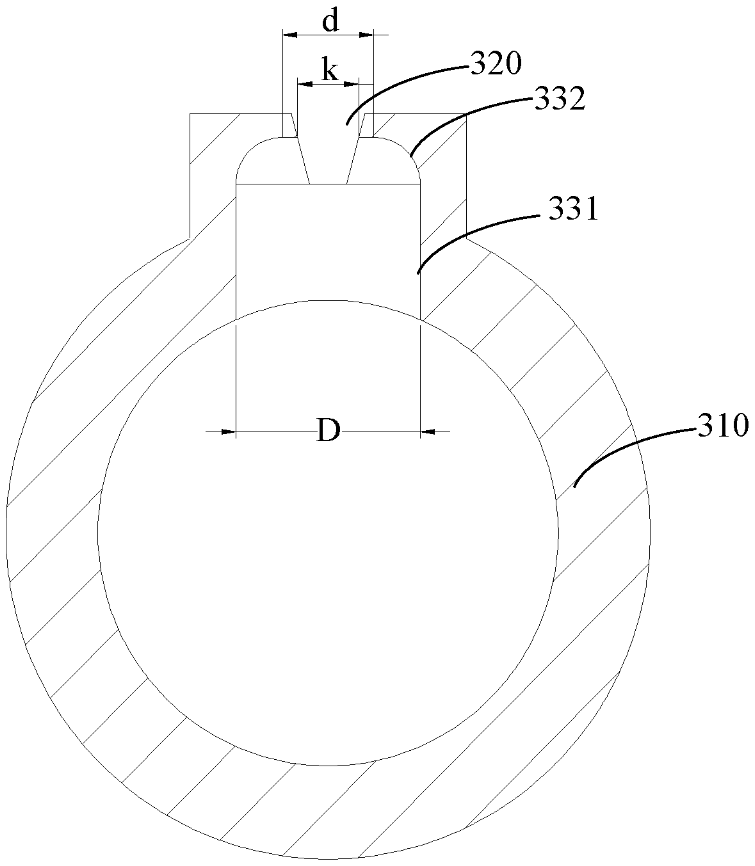
FIG. 5 is an internal schematic view of a cross section of a water spraying pipe.
Figure 6:
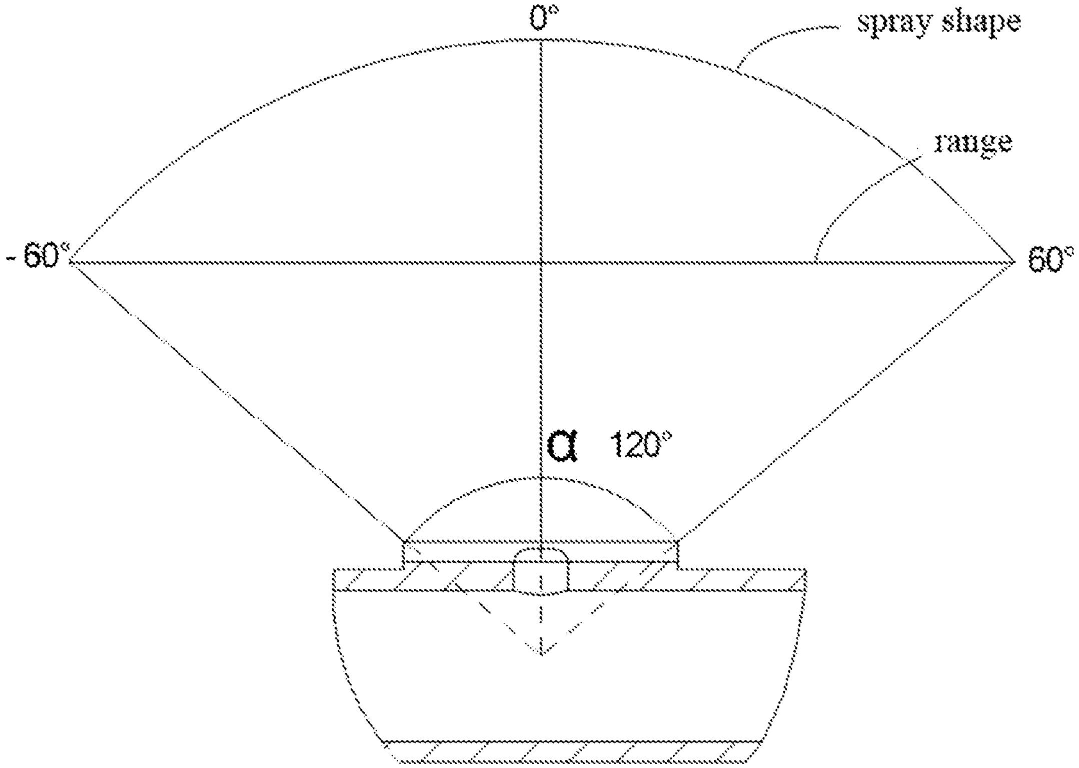
FIG. 6 is an internal schematic view of a longitudinal section of a water spraying pipe.
Figure 7:
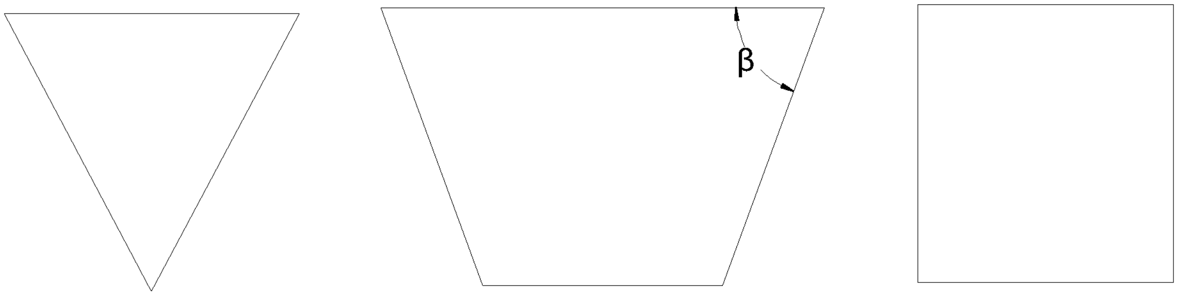
FIG. 7 is a schematic view of a shape of a cross section of a water spraying groove.
Figure 8:
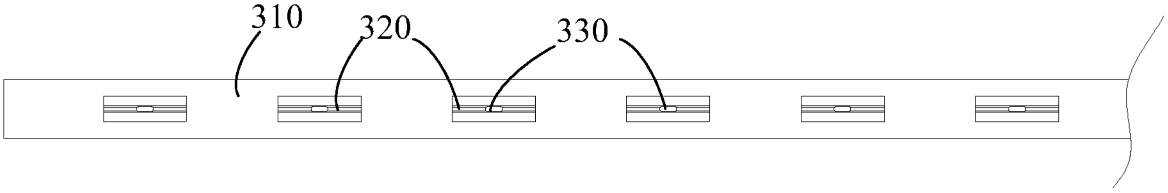
FIG. 8 is a schematic view of another embodiment of a spraying-wash pipe of a spraying-wash device according to the present application.
Figure 9:
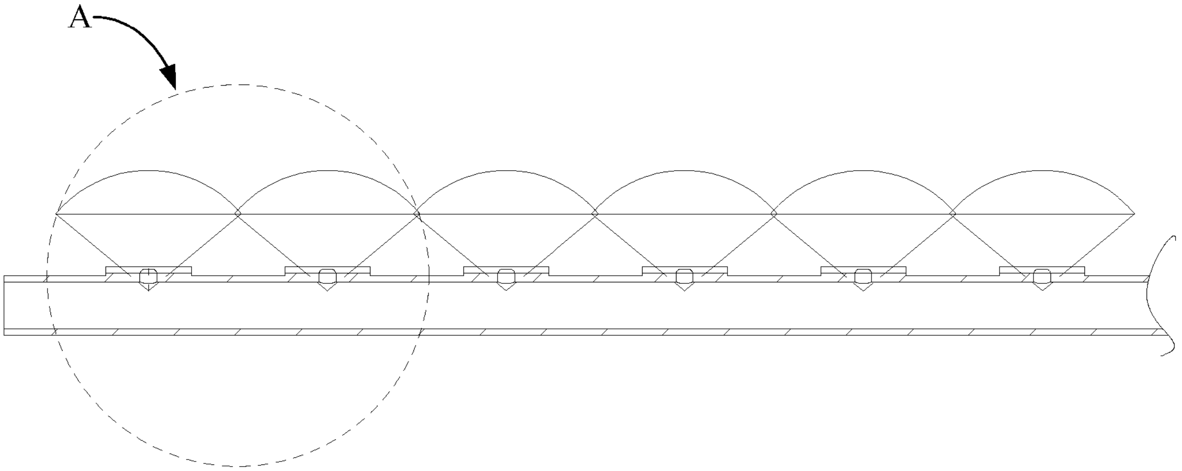
FIG. 9 is a schematic view of an internal work state of FIG. 8.
Figure 10:
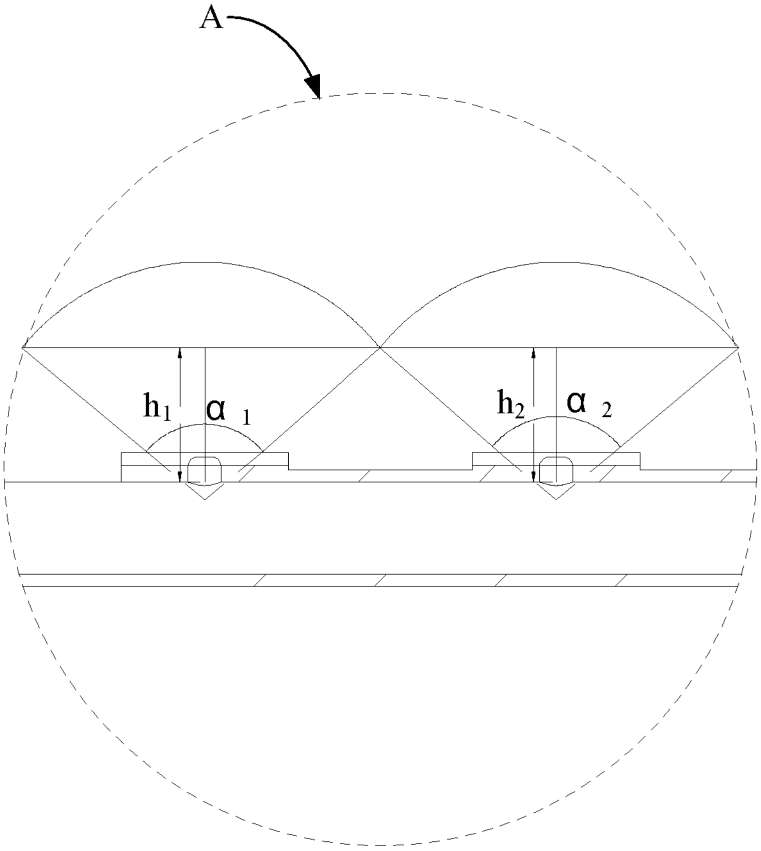
FIG. 10 is a partially enlarged view of portion A in FIG. 9.
Figure 11:
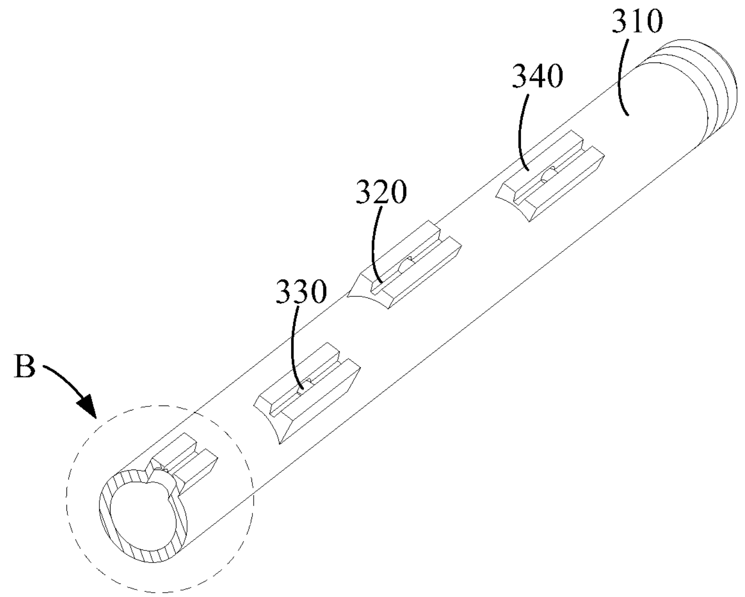
FIG. 11 is a schematic view of a part of a water spraying pipe.
Figure 12:
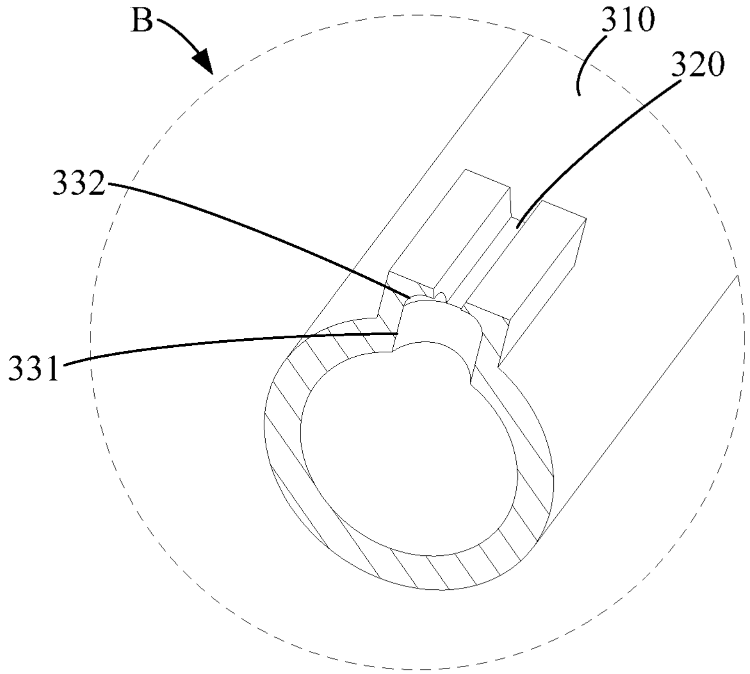
FIG. 12 is a partially enlarged view of portion B in FIG. 11.
Figure 13:
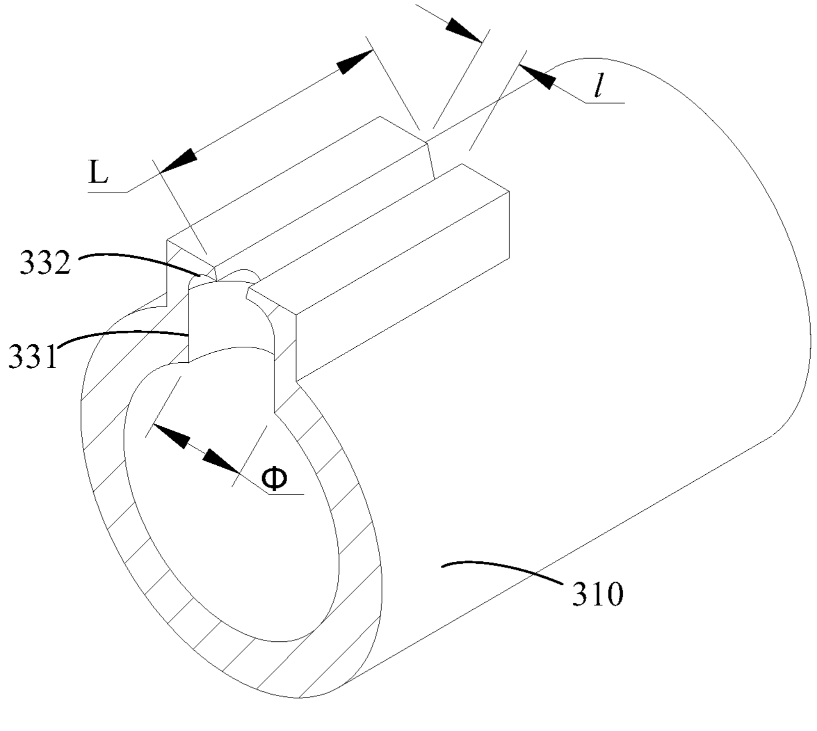
FIG. 13 is an internal schematic view of another embodiment of a water spraying pipe.

With reference to FIGS. 1 to 13, in embodiments of the present application, the spraying-wash device includes: a water spraying pipe 300 defining a water spraying hole 330; a transmission mechanism 100 including a driving gear 110 and driven gears 120 meshing with the driving gear 110, the driven gear 120 being connected to the water spraying pipe 300 to drive rotation of the water spraying pipe 300; and a driving mechanism 200 connected to the driving gear 110 to drive rotation of the driving gear 110.

In the present embodiment, the water spraying pipe 300 is a cylindrical pipe, which includes a water inlet end 311 and a driving end 312. That is, water inletting and driving of the water spraying pipe 300 are distributed to two ends of the water spraying pipe 300 respectively and driving and water inletting structures do not interfere with each other. The water spraying pipe 300 has a water inlet opening at the water inlet end 311 and its driving end 312 is closed and waterflow can only be sprayed from the water spraying hole 330. In some embodiments, in order to save space, the driving mechanism 200 and the water inletting structure may also be provided to an identical end of the water spraying pipe 300. The driving end 312 of the water spraying pipe 300 is closed, the water is introduced through the water inlet end 311 and discharged through the water spraying hole 330 after introduction. The water spraying hole 330 is defined in a pipe wall of the water spraying pipe 300, the waterflow is sprayed from the water spraying hole 330 directly, or a spray head may be mounted in the water spraying hole 330, and the water is sprayed from the spray head.

The driven gear 120 may be directly fitted over the driving end 312, in some embodiments, the driving end 312 may also be provided with a driven rotating shaft thereon, and the driven gear 120 is fitted over the driven rotating shaft. A rotating axis of the driven gear 120 is collinear with an axial axis of the water spraying pipe 300. The driving gear 110 meshes with the driven gear 120, and may have various positions relative to the driven gear 120, such as above, below, left, right, etc. For example, the driving gear is provided below the driven gear 120. If the spraying direction of the water is upward, then the driving gear 110 is provided below to avoid affecting cleaning of the tableware or the like. For example, the driving gear 110 and the driven gear 120 are straight gears. Driven gears 120 are provided, and the number thereof may be two, three or more. For example, two driven gears are provided. The driving gear 110 is disposed between and below the two driven gears, and the driving gear 110 meshes with the two driven gears 120 simultaneously. When the driving gear 110 is in operation, the two driven gears 120 have an identical rotating direction, so that the water spraying pipes 300 connected to the two driven gear 120 have a consistent rotating direction. Thus, consistent operation of water spraying pipes 300 driven by the identical driving gear 110 is facilitated, the cleaning rhythms of the water spraying pipes 300 is consistent, and improvement of the cleaning efficiency is facilitated.

The driving mechanism 200 may have a lot of forms, such as an electric motor, an impeller, a fuel engine. The driving mechanism 200 has a driving shaft, and the driving shaft is directly inserted into the driving gear 110, or is connected to the driving gear 110 after being decelerated by a transmission structure. The driving gear 110 rotates with the driving shaft as the rotating shaft. For example, the driving mechanism 200 is a driving motor, and the driving gear 110 is fixedly connected to a rotating shaft of the driving motor.

In the present embodiment, a driving force of the driving mechanism 200 is transferred to the water spraying pipe 300 through the driving gear 110 and the driven gear 120, so that the water spraying pipe 300 rotates about its axial axis, the water is sprayed from the water spraying hole 330 of the water spraying pipe 300, and forms a spraying-wash area during rotation of the water spraying pipe 300; as the water spraying pipe 300 is driven by a gear structure, the rotation and power transmission of the water spraying pipe 300 are very stable and reliable, and meanwhile, a rotation angle of the water spraying pipe 300 can be controlled accurately to control the change of the spraying-wash area, thus, the spraying-wash device can accurately control the water spraying area, improvement for accuracy of spraying-wash of the tableware or the like by the spraying-wash device is facilitated, and improvements for the utilization of water and the cleaning efficiency are facilitated; one driving gear 110 drives the plurality of driven gears 120 simultaneously to achieve that one driving mechanism 200 drives the plurality of water spraying pipes 300 simultaneously, the utilization of the driving mechanism 200 is improved, the transmission mechanism 100 is simplified, the space is saved, compactness of the driving and transmission structures of the water spraying pipe 300 is improved, and improvement for the stability of the driving of the water spraying pipe 300 is facilitated.

It should be noted that, in order to ensure a range of a water delivery area, a deflection angle $\alpha$ of the water spraying pipe 300 is 0~150°, such as 100~150°; for example, the deflection angle is 120°140°. By setting the rotation angle of the water spraying pipe 300 to 100~150° or 120°~140°, it is avoided that the spraying-wash is unclean due to insufficient spraying-wash water pressure when the angle is too big, and the area to be cleaned cannot be fully covered due to small coverage area of the water spraying pipe 300 when the angle is too small.

It should be noted that, the deflection angle of the water spraying pipe 300 is a central angle, i.e., an angle range swung by the water spraying hole 330 with the axial axis of the water spraying pipe 300 as a center line and a distance from the water spraying hole 300 to the center line as a radius. Within the range of the deflection angle of the water spraying hole 330, the waterflow can pass, and of course within the maximum height that the waterflow can reach. A vertical plane passing through the center line and bisecting the water spraying hole 330 is a datum plane, and the deflection angle is bisected by the datum plane. Taking the deflection angle of 150° as an example, the center line serves as a rotation axis, two inclined planes are formed by deflecting the datum plane to the left and right directions by 75° respectively, and an angle between the two inclined planes is 150°. An area between the two inclined planes is an area where the water is sprayed from the water spraying pipe 300.

It should be noted that, the water spraying pipe 300 is merely a name of the pipe, and the pipe is not only used to spray water. It could be understood that, the water spraying pipe 300 can spray a liquid such as a cleaning liquid, an oil, and the like.

In some embodiments, in order to ensure that the water spraying pipe 300 is rotatable within the preset angle area to ensure the accuracy of the cleaning area, the driving gear 110 or the driven gear 120 is provided with a limiting structure. The limiting structure may be a mechanical structure, the rotations of the driving gear 110 and the driven gear 120 is physically limited by the mechanical structure, to achieve a purpose of controlling the deflection area (of the water spraying pipe 300) rotated by the driven gear 120. The limiting structure may be an electrically controlled sensor structure. The sensor may be a pressure sensor, an optical sensor, a micro-switch, and the like. The sensor structure converts a detected change into a voltage or current signal, and transfers it to a main control circuit of the spraying-wash device. The main control circuit controls the driving mechanism 200 according to a received electrical signal. A few examples will be described below:

A mechanical limiting mechanism: peripheries of the driving gear 110 and/or the driven gear 120 are provided with a limiting block, to limit an angle range defected by the driven gear 120 and the water spraying pipe 300. The periphery of the driving gear 110 or the driven gear 120 is provided with the limiting block, and the limiting block is a square block or a specially shaped block as long as it is unable to mesh with a normal tooth. In one embodiment, when the limiting block is coming into contact with the tooth, it cannot be bypassed by the tooth, and should prevent the tooth from bypassing it, and limiting the continued relative rotation of the driving gear 110 and the driven gear 120. The position of the limiting block is set according to the preset deflection angle range of the water spraying pipe 300. When the tooth on the driving gear 110 abuts against the limiting block on the driven gear 120 (taking the limiting block provided on the driven gear 120 as an example), in this case the deflection angle of the water spraying pipe 300 is the maximum deflection angle.

A micro-switch limitation: peripheries of the driving gear 110 and/or the driven gear 120 are provided with a micro-switch, the micro-switch is connected to the main control circuit of the spraying-wash device, and the main control circuit is electrically connected to the driving mechanism 200. In the meshing process of the driving gear 110 and the driven gear 120, when the driving gear 110 or the driven gear 120 touches or squeezes the micro-switch, the micro-switch can cut off a power source of the driving mechanism 200 directly (in this case, the micro-switch is connected to a control circuit of the driving mechanism 200); or the micro-switch can send a cut-off signal to the main control circuit, and the main control circuit cuts off the power source of the driving mechanism 200 after receiving the cut-off signal, to prevent the driven gear 120 from continuing to rotate.

A sensor limitation: peripheries of the driving gear 110 and/or the driven gear 120 are provided with a pressure sensor, the pressure sensor is connected to the main control circuit of the spraying-wash device, and the main control circuit is electrically connected to the driving mechanism 200. The pressure sensor is connected to the main control circuit, in the meshing process of the driving gear 110 and the driven gear 120, when the tooth of the driving gear 110 or the driven gear 120 touches or squeezes the pressure sensor, a resistance of the pressure sensor is changed, leading to changes in the current passing through the pressure sensor and the voltage loaded on the pressure sensor. The main control circuit cuts off the voltage of the driving mechanism 200 through a trigger circuit or a cut-off circuit after it monitored the changes, and preventing the water spraying pipe 300 from continuing to rotate.

As regard to the position arrangement of the driving gear 110, the driven gear 120 and the driving mechanism 200, in some embodiments, in order to further improve the utilization of space and the compactness of the structure, two driven gears 120 are provided, a diameter of the driving gear 110 is less than a diameter of the driven gear 120, and the driving gear 110 is located between and below the two driven gears 120. The driving mechanism 200 includes a driving motor, a driving shaft of the driving motor is connected to a shaft hole of the driving gear 110, and the driving motor is located at a side of the driving gear 110 facing the water spraying pipe 300.

In the present embodiment, the water supplying component, such as a water pump, of the cleaning apparatus, such as a dishwasher, is provided below the tub or the washing tank, and the water spraying pipe 300 is provided in the tub or the washing tank. That is, the water supplying component such as the water pump is provided below the water spraying pipe 300. When the driving gear 110 and the driving mechanism 200 are also provided below the water spraying pipe 300, the space is fully utilized without additionally increasing a height of the whole cleaning apparatus, and improving the compactness of the structure. Similarly, the driving mechanism 200 is provided at a side of the driving gear 110 towards the water spraying hole 330, so that the mounting location of the driving mechanism 200 additionally increases a width dimension of the cleaning apparatus, the space is fully and reasonably utilized, and the improvement for the compactness of the structure is facilitated.

The structure as regard to the water spraying pipe 300 will be described below in detail:

A water spraying pipe 300 includes: a pipe body 310 having a water inlet end 311, and a water spraying hole 330 provided in a pipe wall thereof; and a water spraying groove 320 defined in the water spraying pipe 300 at a position corresponding to the water spraying hole 330, the water spraying hole 330 being in communication with the water spraying groove 320, a diameter of the water spraying hole 330 being greater than a width of the water spraying groove 320.

In the present embodiment, the pipe body 310 is configured as a cylindrical shape. Structure may refer to the description of the water spraying pipe 300 in the above embodiments. Key points described herein are shapes and position relationships of the water spraying pipe 300 and the water spraying groove 320. The water spraying hole 330 runs through a groove wall of the pipe body 310 and the water in the pipe body 310 can flow out via the water spraying hole 330.

A shape of a cross section of the pipe body 310 may be various, such as a circular shape, an oval shape, a polygonal shape such as a triangular shape, etc. For example, the cross section of the pipe body is set in a circular shape. A shape of a cross section of the water spraying hole 330 may be various, such as a circular shape, an oval shape, a polygonal shape, etc. For example, the cross section of the pipe body is set in a circular shape. A shape of a cross section of the water spraying groove 320 may also be various, such as a U shape, a trapezoidal shape, a V shape, a rectangular shape, etc. In the case that the water pressure and the water spraying hole 330 is determined, the shape of the water spraying groove 320 influences the amount of the water spray. The V shape has a minimum amount of water, the trapezoidal shape has an intermediate amount of water, and the rectangular shape has a maximum amount of water. The shape of the cross section of the water spraying groove 320 is formed in one of the V shape, the trapezoidal shape, and the rectangular shape, and a long base of the trapezoidal shape is close to a groove opening. That is, an end with larger opening corresponds to the groove opening. The cross section of the water spraying groove 320 may be formed in various shapes, so that the water spraying pipe 300 can provide different amounts of water spray to adapt for different working conditions, and improving the adaptability of the water spraying pipe 300. The water spraying groove 320 is formed in an elongated shape, and the water spraying groove 320 may extend in a length direction of the pipe body 310. For example, the length direction of the water spraying groove 320 is parallel to the length direction of the pipe body 310. The bottom of the water spraying groove 320 is in communication with the water spraying hole 330. During the operation of the water spraying pipe 300, the water in the pipe body 310 passes through the water spraying hole 330, into the water spraying groove 320, and is diffused and sprayed in the length direction of the water spraying groove 320. In the process of spraying the water, the waterflow passes through the water spraying hole 330 having a large cross-sectional area under the action of the water pressure, and through an extremely constricted portion (a junction of the water spraying hole 330 and the water groove, whose area is less than the area of the water spraying hole 330), and then is diffused in the water spraying groove 320. Such a flow process allows the waterflow become a disperse waterflow in an interface, producing a fan-shaped waterflow. A projection of the fan shape on the pipe body 310 is parallel to the water spraying groove 320, or rather an extending direction of the water spraying groove 320, determining declination between the fan shape and the length direction of the pipe body 310. If the water spraying groove 320 is parallel to the length direction of the pipe body 310, then a chord length of the fan shape is also parallel to the pipe body 310. After water spraying holes 330 and water spraying grooves 320 are arranged along the length direction of the water spraying pipe 300, a water wall similar to a water blade will be formed in an interface, to greatly increase cleaning area of the water spraying pipe 300. Thus, the cross section inside the dishwasher will be fully covered, achieving a thorough cleaning effect.

In the present embodiment, by provision of the water spraying hole 330 and the water spraying groove 320, waterflow enters the pipe body 310 under the action of water pressure and flows in the pipe body 310, enters the water spraying hole 330 under the action of the water pressure when passing by the water spraying hole 330, and enters the water spraying groove 320 via the water spraying hole 330; in this process, the waterflow passes through the water spraying hole 330 of larger size, and then through the water spraying groove 320 of a smaller width dimension, and is extended and sprayed in the length direction of the water spraying groove 320, thus, the waterflow forms the fan-shape water wall after being sprayed from the water spraying groove 320, and forms a planar cleaning with rotation of the spraying pipe, and greatly improving cleaning effect of the water spraying pipe 300, compared with a linear cleaning area in the related art.

In order to improve the cleaning effect of the water spraying hole 330 and the water spraying groove 320, a ratio of the width l of the water spraying groove 320 to a diameter Φ of the water spraying hole 330 is 0.18~0.25. For example, a value of l/Φ is 0.2. The waterflow enters the water spraying groove 320 from the water spraying hole 330, and the diameter of the water spraying hole 330 and the width of the water spraying groove 320 relate to the change of the water pressure. The water pressure is increased when it enters the water spraying groove 320 from the water spraying hole 330 with a large area. A proportional relationship of the two relates to a reasonable release of the water energy and influences distance and angle of the sprayed waterflow. When l/Φ is too big, a pressure difference is too small, and the distance and intensity of the sprayed waterflow cannot be effectively guaranteed, leading to a non-ideal cleaning effect; when l/Φ is too small, the width hinders the spraying of the waterflow, and the amount and speed of the water will be affected, leading to a non-ideal cleaning effect.

In order to further improve the cleaning effect of the water spraying hole 330 and the water spraying groove 320, a ratio of a length L of the water spraying groove 320 to the diameter Φ of the water spraying hole 330 is greater than or equal to 2.5~3.5, e.g., greater than or equal to 3. The waterflow enters the water spraying groove 320 from the water spraying hole 330, and the diameter of the water spraying hole 330 and the length of the water spraying groove 320 relate to the change of the water pressure. The water pressure is increased when the waterflow enters the water spraying groove 320 from the water spraying hole 330 with a large area, and the water pressure is decreased when the waterflow is diffused in the water groove along the length direction thereof. A proportional relationship of the two relates to a reasonable release of the water energy and influences an angle of the sprayed waterflow. When L/Φ is too small, the length is insufficient for diffusion of the water in the water spraying groove 320 from the water spraying hole 330, and the coverage angle of the sprayed waterflow is reduced (the central angle of the fan shape becomes smaller), prejudicing the spraying-wash of the water spraying pipe 300.

It should be noted that, the amount, the spraying angle, and the distance of the waterflow from the water spraying groove 320 are positively correlated with the diameter of the water spraying hole 330 within a range. A depth of the water spraying hole 330 influences the spraying distance, the hole of a depth can convert energy of horizontal flow in the pipe into energy of vertical flow, facilitating long distance spraying; similarly, a depth will increase the spraying speed, and increasing diffusion angle.

When the cross section of the water spraying groove 320 is formed in an inverted trapezoidal shape, an inclined angle between a leg and a long base of the inverted trapezoidal shape of the water spraying groove 320 is β, which is designed according to the amount of the water. When the amount of water for a single water spraying groove 320 is great, the β may be designed to be great (that is, the cross section evolves from the inverted trapezoidal shape into a rectangular shape). When the amount of water distributed by a single spraying nozzle is small, the β may be designed to be small (that is, the cross section evolves from the inverted trapezoidal shape into a triangular shape). In the present embodiment, β is 15~25°, e.g., 20°. In one embodiment, an angle between a wall face of the water spraying groove 320 and a plane where the groove opening lies is β, and β is 15~25°.

In order to meet the needs of different working conditions, the water spraying grooves 320 having different shapes can be correspondingly provided to an identical water spraying pipe 300, which will be particularly described below:

Water spraying holes 330 and water spraying grooves 320 are provided and correspond to each other, and shapes of cross sections of the plurality of the water spraying grooves 320 are formed in one or more of a V shape, a trapezoidal shape, and a rectangular shape. In the present embodiment, the water spraying holes 330 are in one-to-one correspondence with the water spraying grooves 320. In some embodiments, one water spraying groove 320 may correspond to water spraying holes 330. That is, the water spraying groove 320 is a long groove, and the plurality of water spraying holes 330 are defined in the bottom of the water spraying groove 320. The shapes of the cross sections of the water spraying grooves 320 in an identical water spraying pipe 300 may be various. That is, the angle between the wall face of the water spraying groove 320 and the plane where the groove opening lies can take a variety of values. In some working conditions, different positions need different amounts of water and different flushing intensities, and in this case, this can be achieved by changing the shape of the water spraying groove 320 or adjusting the angle (3.

In some embodiments, the spraying-wash area needs to be divided into strong, medium, and weak, for cleaning of items to be cleaned with different cleanliness levels, and improving the cleaning efficiency. The cross section of the water spraying groove 320 at a middle portion of the water spraying pipe 300 is formed in a rectangular shape or a trapezoidal shape, and the cross sections of the water spraying grooves 320 at two ends of the water spraying pipe 300 are formed in a trapezoidal shape or a V shape; in this case, the middle portion is a strong cleaning area, two ends of the water spraying pipe 300 are medium cleaning regions or weak cleaning regions. Thus, effective and simultaneous cleaning of the tableware to be cleaned with different cleanliness levels is facilitated.

In some embodiments, as the waterflow is sprayed, the water inlet end 311 and the driving end 312 of the water spraying pipe 300 have different water pressures, leading to different water spray effect at the two ends. In order to make the water spray effect at different positions of the water spraying pipe 300 uniform, the cross section of the water spraying groove 320 close to the water inlet end 311 of the water spraying pipe 300 is formed in a V shape, the cross section of the water spraying groove 320 at the middle portion of the water spraying pipe 300 is formed in a trapezoidal shape, and the cross section of the water spraying groove 320 away from the water inlet end 311 of the water spraying pipe 300 is formed in a rectangular shape. Thus, the water spraying groove 320 away from the water inlet end 311 can also spray a large amount of waterflow.

In order to utilize the water energy fully and reasonably to further improve the spaying effect, the water spraying hole 330 includes a water inlet section 331 and a transition section 332 extending from the water inlet section 331 to the water spraying groove 320, and the transition section 332 cuts a bottom of the water spraying groove 320 to extend to a groove opening of the water spraying groove 320. In the present embodiment, taking the water spraying hole 330 having a circular cross section as an example, the transition section 332 extends to the groove opening and cuts the groove bottom. When the cross section of the water spraying groove 320 is formed in a V shape or an inverted trapezoidal shape, a width of the water spraying groove 320 at a junction with the water spraying hole 330 is greater than a width of the bottom of the water spraying groove 320. By providing the transition section 332, a depth of the water spraying hole 330 moves to the groove opening, an inlet area for the water entering the water spraying groove 320 from the water spraying hole 330 is increased, and the water will not be massively wasted in the flowing process, but enter the water spraying groove 320 through the position of the groove side wall, and effectively maintaining the energy of the waterflow, greatly increasing the distance and the declination of the waterflow sprayed form the water groove, and facilitating improvement of the cleaning efficiency of the water spraying pipe 300.

In some embodiments, in order to further enhance the spraying effect, a diameter d of a top of the transition section 332 is less than a diameter D of the water inlet section 331. When the waterflow passes through the water inlet section 331 of a large diameter and through the transition section 332 of a small diameter, the water pressure is increased while the waterflow is guided for transition, facilitating an increase in the spray distance and range.

In the transition process, in order to avoid energy loss of the waterflow due to great friction and collision between the waterflow and the hole wall, an inner wall of the transition section 332 forms an arc-shaped transition from the water inlet section 331 to a wall of the water spraying groove 320. Thus, when the waterflow enters the transition section 332 from the water inlet section 331 and then enters the water spraying groove 320 from the transition section 332, the waterflow is smoothly guided, promoting preservation of the water energy.

In order to further improve the spraying effect of the water spraying groove 320, the width of the water spraying groove 320 at a junction with the top of the transition section 332 is k, and the diameter d is greater than or equal to twice k. In the present embodiment, by setting the diameter d to be greater than or equal to twice k, the change of the water pressure from the transition section 332 into the water spraying groove 320 is ensured, and the pressure difference is ensured, so that the waterflow can more stably, reliably and effectively enter the water spraying groove 320, and can be extended and sprayed along the length of the water spraying groove 320, facilitating improvement of spaying distance and spraying angle.

Forming methods for the water spraying groove 320 may be various. The water spraying groove 320 can be directly defined in the pipe body 310, or can be formed by providing other structures on the pipe body 310, which will be described respectively in the following:

The water spraying groove 320 is defined in an outer wall of the pipe body 310. The water spraying groove 320 is directly defined in the outer wall of the pipe body 310, and the water spraying groove 320 extends along the length direction of the pipe body 310. Such an arrangement simplifies formation process of the water spraying groove 320, and does not need to add extra components, reducing the assembly process. Meanwhile, the water spraying groove 320 is sunk into the pipe body 310 and outside environmental factors are hard to affect the operation of the water spraying groove 320, and improvement for the operational stability of the water spraying groove 320 is facilitated.

In other embodiments, the water spraying pipe 300 further includes a protrusion 340 provided to an outer wall of the pipe body 310 and corresponding to the water spraying hole 330, and the water spraying groove 320 is defined in the protrusion 340. The protrusion 340 may have a variety of forms, such as an elongated protrusion 340, a square protrusion 340, a circular protrusion 340, etc., for example an elongated protrusion 340. The water spraying groove 320 is defined in the protrusion 340, and the bottom of the water spraying groove 320 is connected to the outer wall of the pipe body 310. In some embodiments, the protrusion 340 and the pipe body 310 may be formed into one piece, thus, the connection process of the protrusion 340 and the pipe body 310 may be dramatically simplified, and the improvement for production efficiency of the water spraying pipe 300 is facilitated. By providing the water spraying groove 320 to the protrusion 340, in the case where the pipe body 310 is identical, the thickness of the pipe wall is equivalently increased, so that the strength of the water spraying pipe 300 provided with the water spraying hole 330 is advantageously guaranteed, and the service life of the water spraying pipe 300 is advantageously improved.

In some embodiments, in order to more reasonably utilize the water energy and avoid waste of water energy due to collision between waterflows sprayed from adjacent water spraying grooves 320, water spraying grooves 320 are provided, and each water spraying groove 320 extends along the length direction of the pipe body 310; and the plurality of water spraying grooves 320 are arranged in an S-shape along a length direction of the pipe body 310.

It should be noted that the number of the water spraying grooves 320 arranged in an S-shape is not limited, and may be three, four, five or the like. That is, there may be only one S-shape on the water spraying pipe 300, or S shapes at the same time. That is, a connection line of two adjacent water spraying holes 330 is not consistent with the length direction of the pipe body 310, and also not consistent with the length direction of the water spraying groove 320. In this way, when the declination range sprayed from the water spraying groove 320 is large, projections of adjacent fan-shaped water spaying areas on the pipe body 310 are not collinear, and the water sprayed from two adjacent water spraying grooves 320 will not intersect, and the water energy loss due to collision of water sprayed from two adjacent water spraying grooves 320 is avoided. Thus, when water spray of each water spraying groove 320 has sufficient declination, a secondary flushing will occur in some cleaning areas of the water spraying pipe 300. That is, in a unidirectional rotation process of the water spraying pipe 300, there will be two water walls for flushing an identical area, and dramatically improving the cleaning efficiency of the water spraying pipe 300.

In order to ensuring the cleaning effect while avoiding the waste of the water energy, a height of water sprayed from a first water spraying groove 320 is $h_1$, and a central angle corresponding to its fan-shaped spray-washing area is $\alpha_1$; a height of water sprayed from a second water spraying groove 320 adjacent to the first water spraying groove 320 is $h_2$, and a central angle corresponding to its fan-shaped spray-washing area is $\alpha_2$; a distance between a first water spraying hole 330 and a second water spraying hole 330 adjacent to each other is greater than 0, and less than or equal to: $h_1 \tan(\alpha_1/2)+h_2 \tan(\alpha_2/2)$.

The position relationship between adjacent spray nozzles is not only applied in the present embodiment, but also in other embodiments; in which, $\alpha_1$ and $\alpha_2$, as well as $h_1$ and $h_2$ are influenced by factors such as manufacture and assembly of the water spraying hole 330 and the water spraying groove 320, an angle with the pipe body 310, and a distance from the water inlet end 311 of the pipe body 310; when $\alpha_1=\alpha_2$; $h_1=h_2$, a distance between adjacent water spraying holes 330 is less than or equal to: $2h_1 \tan(\alpha_1/2)+h_2 \tan(\alpha_2/2)$.

By setting the distance between two adjacent water spraying hole 330 in this way, the intersection of adjacent cleaning areas is guaranteed, and effectively ensuring that a cleaning plane formed during rotation of the water spraying pipe 300 is a continuous plane, to achieve a cleaning without any dead angle.

The distance between the first water spraying hole 330 and the second water spraying hole 330 has different actual parameters according to actual situations, and the parameters can be adjusted according to the actual disclosure, which will be described below by some examples of the parameters. In some embodiments, a distance between a first water spraying hole 330 and a second water spraying hole 330 is 20 mm~30 mm. Similarly, the number of the water spraying holes 330 in each water spraying pipe 300 should also be determined according to actual situations. In some embodiments, eight to ten water spraying holes 330 are provided in each water spraying pipe 300.

In some embodiments, in order to ensure the cleaning effect of the water spraying pipe 300, if a total amount of circulating water is M, a flow velocity of water in the water spraying hole 330 is V, a total number of the water spraying holes 330 is N, and an area of a cross section of the water spraying hole 330 is S, then: $M*V \geq N*S/2$. That is, $M \geq N*S/(2V)$. After the spraying-wash device is formed, the total number N of the water spraying holes 330 and the area of the cross section of the water spraying hole 330 are constant, the total amount of circulating water can be set according to the needed water velocity.

In which, $V \geq (N*S/2)/M$, M/N is the amount of water spray of a single spray nozzle; for example, the flow velocity is $V \geq 1/2$(m/s).

A cleaning apparatus is provided, and the cleaning apparatus may have various forms, such as a dishwasher, a fruit and vegetable cleaning apparatus, etc. The cleaning apparatus includes a tub or a washing tank and a spraying-wash device, and the structure of the spraying-wash device may refer to the above embodiments. The tub or the washing tank has a washing chamber, and the water spraying pipe 300 of the spraying-wash device is mounted in the washing chamber.

In order to meet people's needs, some control methods adapted for different working conditions are disclosed in the following, which specifically refer to the following embodiments.

A control method for a spraying-wash device is provided. The spraying-wash device includes a water spraying pipe 300. A pip wall of the water spraying pipe 300 defines several water spraying holes 330 therein. The waterflow enters the water spraying pipe 300 from the water inlet end 311 of the water spraying pipe 300 and is sprayed from the water spraying hole 330. The control method for the spraying-wash device includes:

obtaining a cleaning instruction;

there are a variety of ways to obtain the cleaning instruction. For example, the cleaning instruction can be sent by the user through a mobile terminal or a manual button, or automatically triggered when conditions are met during operation of the cleaning apparatus. The qualified condition may be that items to be cleaned are detected in the washing chamber. There are a variety of detection methods, such as an infrared sensor, a gravity sensor, etc. In some embodiments, in order to improve the control accuracy, before the cleaning, it can be detected whether the cleanliness of the items to be cleaned meets the cleanliness standard of tableware.

obtaining a cleaning mode on basis of the cleaning instruction;

the cleaning instruction may be a single start instruction, or an instruction carrying mode information. When the instruction is an instruction carrying the mode information, the cleaning device searches a mapping table according to the corresponding mode, and can perform the control according to a parameter obtained from the mapping table. The mapping table is a predefined relationship table between modes and operational references of the spraying-wash device. When the cleaning instruction does not have the mode information, current working condition or current time can be detected or obtained by a detection device, to control the operational parameter according to the detected result, or according to the current time information. The cleaning modes correspond to the cleaning working conditions, and may be constant strong wash, weak wash and medium wash, or a cleaning mode set for improvement of the cleaning effect.

controlling the water spraying pipe 300 to rotate about its axial axis within a preset rotation angle range according to the cleaning mode.

The water spraying pipe 300 rotates about an axis along its length direction, and the axial axis of the water spraying pipe 300 passes through an interior of the water spraying pipe 300, e.g., through a center of its cross section. The preset rotation angle range may refer to the deflection angle mentioned in the above embodiments. The preset rotation angle range is 0~150°, e.g., 120°. Taking a plane through the center line and the water spraying hole 330 and bisecting the rotation angle range as an example, two sides of the plane are rotation angle ranges of 60° respectively. That is, the water spraying hole 330 can rotate within left and right ranges of 60°, or rather, in the operational process, an angle between the orientation of the water spraying hole 330 and the plane can be any value of −60°~60°.

In the present embodiment, the cleaning instruction is obtained, the cleaning mode is obtained according to the cleaning instruction, and then the water spraying pipe 300 is controlled to rotate about its axial axis within the preset rotation angle range according to the cleaning mode, so that rotation of the water spraying pipe 300 is limited within the preset range, useless work of the water spraying pipe 300 (the water sprayed from the water spraying pipe 300 is not sprayed to the items to be cleaned or the specified cleaning area) is avoided, and the improvement for the cleaning efficiency of the water spraying pipe 300 is facilitated; by setting the water spraying pipe 300 to rotate about its axial axis, the space required by the rotation of the water spraying pipe 300 is very small, and it is not easy to be stuck, facilitating improvement for operational stability of the water spraying pipe 300; as regard to a non-circular washing chamber, the water spraying pipe 300 may be arranged according to the shape of the washing chamber, the water spray by rotation of the water spraying pipe 300 on its own axis facilitates an increase in the coverage area, cleaning of the dead angle, and improvement of the cleaning effect, compared with the water spray by rotation of a spraying arm.

The cleaning process of the items to be cleaned includes several stages. In a first stage, there is a lot of dirt, in which case high frequency cleaning is needed to clean the vast majority of dirt, leaving only the dirt that is difficult to clean; in a second stage, as regard to the dirt that is difficult to clean, continuous long cleaning is needed, for the dirt that is difficult to clean, the continuous long cleaning can better improve the cleaning effect; the step of controlling the water spraying pipe 300 to rotate within the preset rotation angle range according to the cleaning mode includes:

- within a first preset time period counted from start of operation of the water spraying pipe 300, rotating the water spraying pipe 300 at a first rotational speed;
- within a second preset time period after the first preset time period, rotating the water spraying pipe 300 at a second rotational speed; and
- the first rotational speed is greater than the second rotational speed.

The rotational speed of the water spraying pipe 300 is 10~60 r/min (revolutions per minute, i.e., the number of revolutions within one minute), for example, 10~40 r/min. For example, the first preset time period is 5~10 minutes, within the first preset time period when the cleaning is just started, the water spraying pipe 300 rotates at the first rotational speed, e.g., 40 r/min; for example, the second preset time period is 6~8 minutes, within the second preset time period, the water spraying pipe 300 rotates at a rotational speed of 20 r/min. The high frequency rotation flushes the large amount of dirty to clean it, and then the long cleaning cleans the dirty that is difficult to clean, facilitating the cleaning effect of the spraying-wash device.

In some embodiments, in order to improve the cleaning effect, the preset rotation angle range is equally divided into N cleaning areas according to the angle, and the step of controlling the water spraying pipe 300 to rotate within the preset rotation angle range according to the cleaning mode includes:

- obtaining a current cleaning area corresponding to the water spraying pipe 300;
- obtaining a preset spraying-wash time period for a current position according to the current cleaning area; and
- controlling the water spraying pipe 300 to turn to the next cleaning area after the current cleaning area has been cleaned for the preset spraying-wash time period.

In the present embodiment, the rotation angle range is divided into cleaning areas, and the range of each cleaning area is determined by rotation angle. The range of each cleaning area may be identical or different, which may be set according to the actual situations. For example, the rotation angle range is 120°, and ranges of the plurality of cleaning areas are equal. If the rotation angle range 120° is divided into 30 equal parts, and each equal part corresponds to one cleaning area, the central angle corresponding to the range of each cleaning area is 4°.

Each spraying-wash time period of the water spraying pipe 300 for each cleaning area may be identical or may be set to be different according to actual needs. For example, each spraying-wash time period is identical, and each cleaning area spraying-wash time period is 4~6 seconds, e.g., 5 seconds. When the spraying-wash period time for each cleaning area is not necessarily the same, it needs to obtain a current position of the water spraying pipe 300, i.e., a corresponding cleaning area or a deflected angle, and then to obtain the accurate cleaning time period according to the angle information or the cleaning area information. In one embodiment, an angle range and a position included by each cleaning area, and a corresponding cleaning time period can be pre-stored in a storage device of the spraying-wash device in the form of a mapping table. The water spraying pipe 300 stays at a corresponding cleaning area for a corresponding time period, and then continues to rotate to the next cleaning area for cleaning of the next cleaning area.

In the above cleaning process, it could be understood that, when cleaning one cleaning area, the water spraying pipe 300 can be controlled to rotate or to be stationary according to the actual situations. In some embodiments, the water spraying pipe 300 can be controlled to deflect back and forth within the small cleaning area, and this generally happens in the case where the cleaning range of the water spraying pipe 300 at a single cleaning position is difficult to cover the whole cleaning area.

In some embodiments, in order to ensure the cleaning effect and considering that when the declination of the water spraying pipe 300 is varied, its water delivery distance and cleaning intensity will change, a cleaning area corresponding to the vertically upward water spraying hole 330 is a first cleaning area, and within the preset deflection angle range, a cleaning area corresponding to a position where an angle between a depth direction of the water spraying hole 330 and the vertical direction is the maximum is a second cleaning area;

- preset spraying-wash time periods for respective cleaning areas gradually increase from the first cleaning area to the second cleaning area.

In the present embodiment, the parameters of the above embodiments will be used for continued description. For example, an angle range covered by the vertically upward cleaning area (the first cleaning area) is −2~2°, and then an angle range covered by the second cleaning area (two areas having the maximum declination) is 56~60° or −56~−60°. There are many ways to increase the spraying-wash time period, such as increasing linearly, increasing according to a preset curve, etc. In the present embodiment, for example, 0.05~0.3 seconds is increased for each cleaning area, e.g., 0.1 seconds is increased. If the staying time period for the first cleaning area is 4 seconds, then the spraying-wash time period for a cleaning area adjacent to the first cleaning area is 4.1 seconds. Thus, the spraying-wash time period for the second cleaning area is 4+15*0.1 seconds, i.e., 5.5 seconds. In the present embodiment, the spraying-wash time period is increased when the declination is large, to ensure the cleaning effect of each cleaning area, and facilitating improvement for the cleaning effect of the spraying-wash device.

In some embodiments, in order to improve the operational stability of the water spraying pipe 300, the step of controlling the water spraying pipe 300 to rotate within the preset rotation angle range according to the cleaning mode includes:

- obtaining a preset deflection speed according to the current cleaning mode;
- within the preset rotation angle range, the water spraying pipe 300 rotates back and forth at the preset deflection speed.

In the present embodiment, the deflection speed serves as a working parameter of the water spraying pipe 300, corresponding to a cleaning mode. Different cleaning modes relate to different and working conditions, and needs different deflection speed, which is not limited herein, for example, 10~40 r/min. Within the range of −60~60°, the rotation of the spraying pipe varies, deflecting from vertically upward 0° to a position of 60°, from the position of 60° to 0°, and then to a position of −60°, repeatedly. In such a way, the rotation of the water spraying pipe 300 has a very simple pattern, and the operation of the water spraying pipe 300 is very stable.

In some embodiments, in order to obtain a more accurate initial position of the water spraying pipe 300, and guarantee the normal operation of the spraying-wash device, the spraying-wash device further includes a driving gear 110 and a driven gear 120, the driving gear 110 is connected to a driving device, the driven gear 120 is connected to the water spraying pipe 300, and the driving gear 110 and/or the driven gear 120 is provided with a detection device;

before the step of controlling the water spraying pipe 300 to rotate within the preset rotation angle range according to the cleaning mode, the method further includes:

detecting a current deflection angle of the water spraying pipe 300;

comparing the deflection angle and a preset initial angle;

when a difference between the current deflection angle and the preset initial angle is greater than or less than zero, adjusting the deflection angle of the water spraying pipe 300 to make the difference between the current deflection angle and the preset initial angle be zero.

In the present embodiment, an orientation of the water spraying hole 330 of the water spraying pipe 300 is defined as 0 degree when it is vertically upward, i.e., an initial position. There are a variety of detection ways for the current declination of the water spraying pipe 300, which can be achieved by a mechanical structure, or achieved by a sensor or a micro-switch. That is, the detection device may be a mechanical limitation structure, or may be a pressure sensor, an infrared sensor, an optical sensor or a micro-switch, etc.

The mechanical detection is firstly described below. Peripheries of the driving gear 110 and/or the driven gear 120 are provided with a limiting block. When the tooth engages with the limiting block, relative rotation of the driving gear 110 and the driven gear 120 is stopped. The limiting block may be provided at a position corresponding to the initial position, or corresponding to extremums of the preset declination range. According to the parameters of the above embodiments, it may be provided at a position of 0°, 60°, or −60°. The mechanical detection has a very reliable stability.

The micro-switch is provided at peripheries of the driving gear 110 and/or the driven gear 120. In the meshing process of the driving gear 110 and the driven gear 120, the micro-switch is squeezed, and then the micro-switch sends a position signal to a main control circuit of the spraying-wash device. The micro-switch may be provided at various positions, for example, at a position of 0°, 60°, or −60°. The pressure sensor, the optical sensor or the like can directly detect the current declination of the water spraying pipe 300, to obtain the deflection angle directly. The micro-switch, the sensor or the like can obtain the current deflection angle and respond rapidly.

The current declination is obtained and then compared with the preset initial angle, and for example, the initial angle is 0°. In some embodiments, the initial angle may be set to non-zero degrees, such as 30°, 15°, −15°, −30°. When the difference between the current angle and the preset initial angle is 15°, the water spraying pipe 300 can be driven by the driving motor to defect 15°.

It should be noted that, an example will be described below as regard to the relationship of the driving motor and the deflection angle and the deflection speed of the water spraying pipe 300. In the present embodiment, the motor employs a stepper motor, the deflection speed of the water spraying pipe 300 is determined by a pulse frequency of the drive, the higher the pulse frequency, the faster the rotational speed of the water spraying pipe 300 is. An operational angle of the water spraying pipe 300 is determined by the number of the pulses, and different numbers of pulses correspond to different operational angles, i.e., different deflection angles. The greater the number of the pulses, the greater the deflection angle is (in a one-way driving process). The rotation speed and rotation position of the water spraying pipe 300 can be controlled by controlling the pulse frequency and the pulse number of the driving motor.

and

What is claimed is:

1. A water spraying pipe comprising:

a pipe body having a water inlet end, and a water spraying hole provided in a pipe wall thereof; and a water spraying groove defined in the water spraying pipe at a position corresponding to the water spraying hole, wherein the water spraying hole is in communication with the water spraying groove, wherein a diameter Φ of the water spraying hole is greater than a width l of a widest portion of the water spraying groove, wherein the water spraying hole comprises a water inlet section and a transition section extending from the water inlet section to the water spraying groove, and the transition section cuts a bottom of the water spraying groove to extend to a groove opening of the water spraying groove, wherein a diameter d of a top of the transition section is less than a diameter D of the water inlet section, and wherein a width of the water spraying groove at a junction with the top of the transition section is k, and the diameter d of the top of the transition section is greater than or equal to twice k.

2. The water spraying pipe according to claim 1, wherein a ratio of the width 1 of the water spraying groove to the diameter Φ of the water spraying hole is 0.18~0.25.

3. The water spraying pipe according to claim 1, wherein a ratio of a length L of the water spraying groove to the diameter Φ of the water spraying hole is greater than or equal to 2.5~3.5.

4. The water spraying pipe according to claim 1, wherein a shape of a cross section of the water spraying groove is formed in one of a V shape, a trapezoidal shape, and a rectangular shape, wherein a top of the V shape and a long base of the trapezoidal shape are arranged away from a center of the pipe body, and wherein a bottom of the V shape and a short base of the trapezoidal shape are arranged closer to the center of the pipe body than the top of the V shape and the long base of the trapezoidal shape, respectively.

5. The water spraying pipe according to claim 4, wherein the water spraying pipe comprises a plurality of the water spraying hole and a plurality of the water spraying groove corresponding to the plurality of the water spraying hole, respectively, and wherein shapes of cross sections of the plurality of the water spraying groove are formed in one or more of the V shape, the trapezoidal shape, and the rectangular shape.

6. The water spraying pipe according to claim 5, wherein a cross section of the water spraying groove at a middle portion of the water spraying pipe is formed in the rectangular shape or the trapezoidal shape, and the cross sections of the water spraying grooves at two ends of the water spraying pipe are formed in the trapezoidal shape or the V shape, or wherein a cross section of the water spraying groove close to the water inlet end of the water spraying pipe is formed in the V shape, a cross section of the water spraying groove at the middle portion of the water spraying pipe is formed in the trapezoidal shape, and a cross section of the water spraying groove away from the water inlet end of the water spraying pipe is formed in rectangular shape.

7. The water spraying pipe according to claim 1, wherein an inner wall of the transition section forms an arc-shaped transition from the water inlet section to a wall of the water spraying groove.

8. The water spraying pipe according to claim 1, wherein an angle between a wall face of the water spraying groove and a plane where the water spraying groove opening lies is $\beta$, and $\beta$ is 15~25°.

9. The water spraying pipe according to claim 1, wherein the water spraying groove is defined in an outer wall of the pipe body.

10. The water spraying pipe according to claim 1, wherein the water spraying pipe further comprises a protrusion provided to an outer wall of the pipe body and corresponding to the water spraying hole, and the water spraying groove is defined in the protrusion.

11. The water spraying pipe according to claim 1, wherein the water spraying pipe further comprises a plurality of the water spraying groove, and where the plurality of the water spraying groove are arranged in an S-shape along a length direction of the pipe body.

12. The water spraying pipe according to claim 1, wherein the water spraying groove is a first water spraying groove, and the water spraying hole is a first water spraying hole, wherein the water spraying pipe further comprises a second water spraying hole and a second water spraying groove corresponding to the second water spraying hole, wherein a height of water sprayed from the first water spraying groove is h1, and a central angle corresponding to its fan-shaped spray-washing area is $\alpha 1$, wherein a height of water sprayed from the second water spraying groove adjacent to the first water spraying groove is h2, and a central angle corresponding to its fan-shaped spray-washing area is $\alpha 2$, and wherein a distance between the first water spraying hole and the second water spraying hole adjacent to each other is greater than 0, and less than or equal to: $h1 \tan(\alpha 1/2)+h2 \tan(\alpha 2/2)$.

13. The water spraying pipe according to claim 1, wherein the water spraying hole is a first water spraying hole, the water spraying pipe further comprises a second water spraying hole, and a distance between the first water spraying hole and the second water spraying hole is 20 mm~30 mm; and/or wherein eight to ten of the water spraying hole are provided in the water spraying pipe.

14. The water spraying pipe according to claim 1, wherein if a total amount of circulating water is M, the water spraying hole is one of N water spraying holes, a flow velocity of the circulating water in the water spraying hole is V, and an area of a cross section of the water spraying hole is S, then: $M*V \geq N*S/2$.

15. A cleaning apparatus comprising: a water spraying pipe according to claim 1.

16. The water spraying pipe according to claim 1, wherein the water spraying pipe further comprises a protrusion provided to an outer wall of the pipe body and extending in a length direction of the pipe body, wherein a first portion of the water spraying groove and a second portion of the water spraying groove are defined in the protrusion along the length direction of the pipe body, wherein the first portion of the water spraying groove corresponds to the water spraying hole, and the second portion of the water spraying groove does not correspond to the water spraying hole, wherein a junction of the first portion of the water spraying groove and the water spraying hole is arranged radially away from a center axis of the pipe body, and a closed end of the second portion of the water spraying groove is arranged closer to the center axis of the pipe body than the junction of the first portion of the water spraying groove and the water spraying hole, and wherein a width of the junction of the first portion of the water spraying groove and the water spraying hole is wider than a width of the closed end of the second portion of the water spraying groove.

* * * * *